US012216520B2

(12) United States Patent
Weiss et al.

(10) Patent No.: US 12,216,520 B2
(45) Date of Patent: Feb. 4, 2025

(54) DIRECT ACCESS TO WAKE STATE DEVICE FUNCTIONALITY FROM A LOW POWER STATE

(71) Applicant: Apple Inc., Cupertino, CA (US)

(72) Inventors: Jacob Z. Weiss, Sunnyvale, CA (US); Ardra Singh, Mountain View, CA (US); Ari Y. Benbasat, San Jose, CA (US); Arthur L. Spence, San Jose, CA (US); Asha G. Karvaje, San Jose, CA (US); Brent W. Schorsch, San Jose, CA (US); Giovanni Corradini, Prague (CZ); Steven S. Noble, Soquel, CA (US)

(73) Assignee: Apple Inc., Cupertino, CA (US)

( * ) Notice: Subject to any disclaimer, the term of this patent is extended or adjusted under 35 U.S.C. 154(b) by 439 days.

(21) Appl. No.: 17/174,292

(22) Filed: Feb. 11, 2021

(65) Prior Publication Data

US 2021/0389816 A1    Dec. 16, 2021

Related U.S. Application Data

(60) Provisional application No. 63/039,916, filed on Jun. 16, 2020.

(51) Int. Cl.
*G06F 1/3234*    (2019.01)
*G04G 21/08*    (2010.01)
(Continued)

(52) U.S. Cl.
CPC ........... *G06F 1/3265* (2013.01); *G04G 21/08* (2013.01); *G06F 1/3287* (2013.01); *G09G 5/003* (2013.01);
(Continued)

(58) Field of Classification Search
None
See application file for complete search history.

(56) References Cited

U.S. PATENT DOCUMENTS 9,727,134 B2    8/2017    Aurongzeb et al.
2012/0233571 A1    9/2012    Weaver et al.
(Continued)

FOREIGN PATENT DOCUMENTS

CN    1871576 A    11/2006
CN    104503691 A    4/2015
(Continued)

OTHER PUBLICATIONS

Indian Office Action from Indian Patent Application No. 202114026494, dated Jun. 3, 2022, 6 pages.
(Continued)

*Primary Examiner* — Andre L Matthews
(74) *Attorney, Agent, or Firm* — BAKERHOSTETLER

(57) ABSTRACT

Direct access to device functionality from a low power state of the device is provided. The direct access can be provided without an initial user input to wake the device or the display of the device before activating the desired functionality. The low power state of the device may include a low power state of the display in which the time is persistently displayed, and may include a low power state or an inactive state of a main processor of the device. The direct access can be provided by detecting a type, location, or other aspects of a user input received while the device is in the low power state.

27 Claims, 6 Drawing Sheets

(51) Int. Cl.
   *G06F 1/3287*   (2019.01)
   *G06F 3/04883*  (2022.01)
   *G09G 5/00*     (2006.01)
   *G09G 5/02*     (2006.01)
   *G09G 5/10*     (2006.01)

(52) U.S. Cl.
   CPC ............... *G09G 5/02* (2013.01); *G09G 5/10* (2013.01); *G06F 3/04883* (2013.01); *G09G 2320/0626* (2013.01); *G09G 2320/0666* (2013.01); *G09G 2330/023* (2013.01); *G09G 2354/00* (2013.01); *G09G 2360/144* (2013.01)

(56) References Cited

U.S. PATENT DOCUMENTS

| | | | |
|---|---|---|---|
| 2014/0051478 | A1 | 2/2014 | Gu |
| 2015/0154732 | A1 | 6/2015 | Artamonov |
| 2015/0185811 | A1 | 7/2015 | Connell et al. |
| 2015/0277540 | A1 | 10/2015 | Jackson |
| 2015/0334219 | A1* | 11/2015 | Soundararajan ........ H04M 1/67 455/414.1 |
| 2017/0010751 | A1* | 1/2017 | Shedletsky ............ G06F 3/044 |
| 2017/0061934 | A1 | 3/2017 | Shin |
| 2017/0160898 | A1 | 6/2017 | Lee et al. |
| 2017/0352325 | A1 | 12/2017 | Spence |
| 2018/0088797 | A1* | 3/2018 | McAtee ................ G06F 1/1694 |
| 2018/0108111 | A1 | 4/2018 | Zhu |
| 2018/0240260 | A1* | 8/2018 | Lee .......................... G06T 11/60 |
| 2019/0004595 | A1 | 1/2019 | Mizuno |
| 2020/0380926 | A1 | 12/2020 | Douglas et al. |
| 2021/0141481 | A1* | 5/2021 | Jeon ...................... G06F 3/0446 |

FOREIGN PATENT DOCUMENTS

| | | |
|---|---|---|
| CN | 104793869 A | 7/2015 |
| CN | 105393209 A | 3/2016 |
| CN | 105426141 A | 3/2016 |
| CN | 110908496 A | 3/2020 |
| JP | H 10-320094 | 2/1998 |
| JP | 2006-074755 | 3/2006 |
| JP | 2009-217775 | 9/2009 |
| JP | 2013-114452 A | 6/2013 |
| JP | 2013-164814 | 8/2013 |
| JP | 2013-171416 | 9/2013 |
| JP | 2015-135611 A | 7/2015 |
| JP | 2017-117121 | 6/2017 |
| JP | 2017-138658 | 8/2017 |
| JP | 2020-507870 | 3/2020 |
| WO | WO2013/129621 | 9/2013 |

OTHER PUBLICATIONS

Japanese Office Action from Japanese Patent Application No. 2021-069912, dated May 17, 2022, 15 pages including English language translation.

Chinese Office Action from Chinese Patent Application No. 202110663487.1, dated Dec. 26, 2023, 19 pages including English language translation.

Japanese Office Action from Japanese Patent Application No. 2023-096370, mailed Jul. 5, 2024, 8 pages including English language translation.

Japanese Office Action from Japanese Patent Application No. 2021-069912, dated Feb. 10, 2023, 9 pages including English language translation.

Chinese Office Action from Chinese Patent Application No. 202110663487.1, dated Sep. 21, 2024, 12 pages including English language translation.

Chinese Office Action from Chinese Patent Application No. 202110663487.1, dated Nov. 30, 2024, 15 pages including English language translation.

\* cited by examiner

DIRECT ACCESS TO WAKE STATE DEVICE FUNCTIONALITY FROM A LOW POWER STATE

CROSS REFERENCE TO RELATED APPLICATIONS

This application claims the benefit of priority to U.S. Provisional Patent Application No. 63/039,916, entitled "Direct Access To Wake State Device Functionality From A Low Power State," filed on Jun. 16, 2020, the disclosure of which is hereby incorporated herein in its entirety.

TECHNICAL FIELD

The present description relates generally to power management for a device, including providing direct access to wake state device functionality from a low power state.

BACKGROUND

A device such as a smartwatch, a smartphone, a laptop or a wearable device may have a wake state in which a display and a processor of the device are active for accepting user input and providing output. To conserve power, a device may enter a sleep state when the device is not in use for a period of time.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
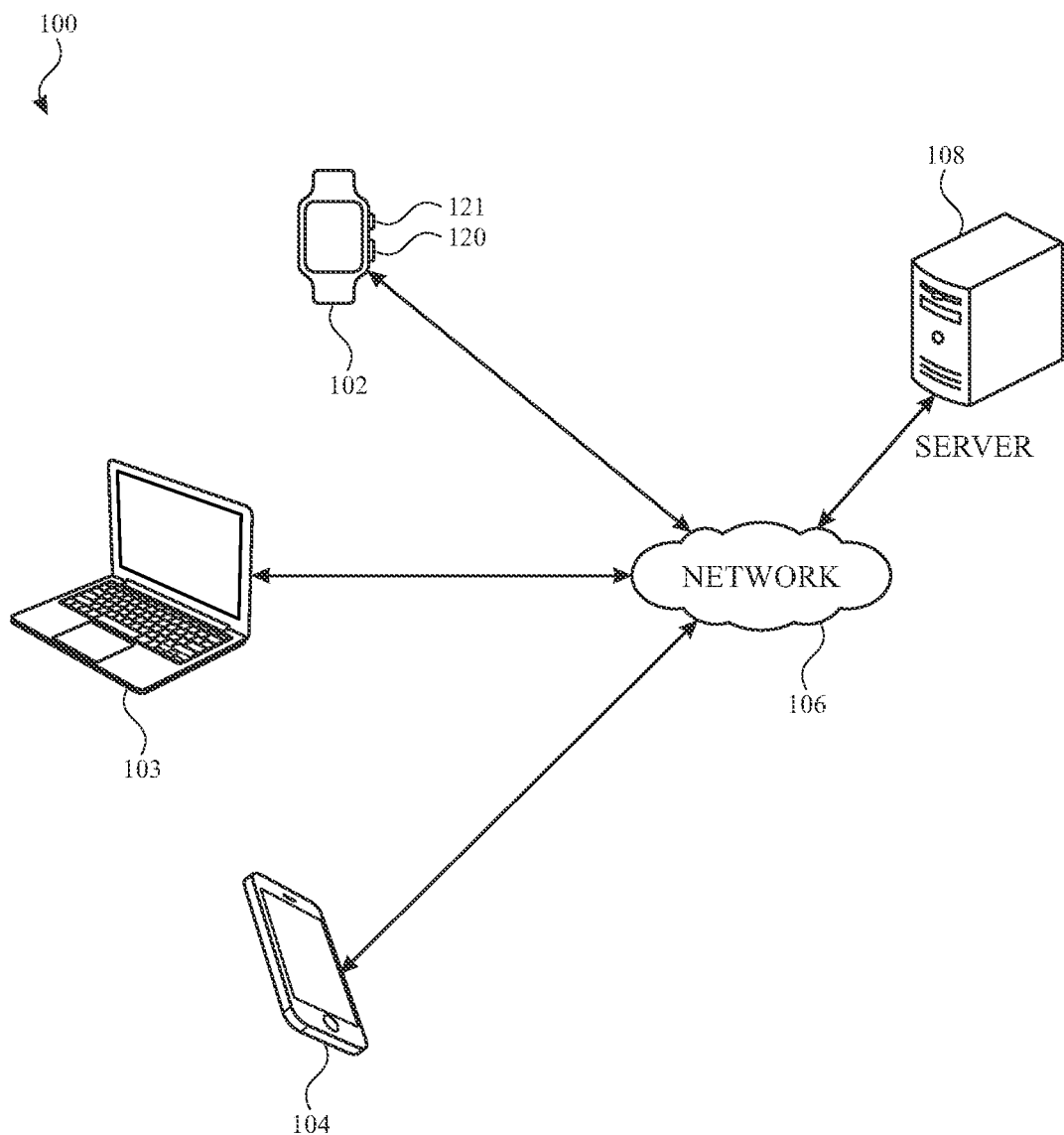
FIG. 1 illustrates an example network environment for providing direct access to device functionality from an inactive state of a display and/or other low power state of the display, in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

A device such as a smartwatch, a smartphone, a laptop or a wearable device may display images, such as a sequence of images or a series of images. For example, a clock application running on a smartwatch may display a sequence of images to reflect the movement of clock hands to show time. The clock application may further be configured to display one or more complications, which may be graphical user interface elements that provide particular content/information, such as a weather complication (e.g., temperature), a date complication (e.g., a day of the week and/or a day of the month) and/or third party data complication (e.g., notifications).

For example, the device may display the clock hands and/or complications in association with a raise motion (e.g., a lifting of a smartphone or a wrist raise gesture of a smartwatch indicating user intent to view content on the screen of the device). With respect to a down gesture (e.g., a motion to set the smartphone down or turn the display away from the user's face and/or a wrist down gesture of the smartwatch indicating user intent not to view content), and/or a period of inactivity (e.g., a period of lack of motion of the device and/or lack of user input to the device) some systems may transition the display of the device, and/or a processor of the device, into a low power state to save power.

In one or more implementations, in a low power state of the display and/or processor, continuous (or prolonged) display of information can be provided while reducing power consumption by pre-storing the information being displayed using a data structure, the data structure having been generated in advance during a normal power state (e.g., a wake state) of the device. The data structure may include image frames and associated scheduled (e.g., future) display times for displaying the image frames. In this way, the low power state of the display corresponds to a low power state of the device in which the display appears to be active. The display can be operated in the low power state while the main processor is active (e.g., to reduce power consumed by the display while the main processor executes a media player application to play music or other non-video media that does not require use of the display) and/or in a sleep mode of the device in which the main processor of the device is inactive.

The image frames displayed while the display is in the low power state (e.g., and while the main processor of the device is in a low power or inactive state), may include images of complications. In some devices, when a display is in an inactive state, a user input to activate the display (e.g., a raise motion, a touch input to the display, a press of a button, or a rotation of a watch crown) and/or to activate the main processor of the device may be required before the user can interact with (e.g., select) a complication. In such devices, the user input to activate the display and/or the main processor may also be required before a subsequent user input (e.g., a touch, swipe, press or other input to the display, a press of a button, or a turn of a watch crown) can be received for controlling the device.

However, if a display is in a low power mode and displaying images to appear active, a separate activation input to activate the device for subsequent access to device features (and/or the latency associated therewith) can be counterintuitive or otherwise undesirable. In one or more implementations, the subject system provides for direct access to device functionality, via the display or other input components, even when the display is in the low power state (e.g., without an intervening activation input to the device and/or without any additional latency).

In one or more implementations, the direct access may include direct access, via the display in the low power state, to an application corresponding to a complication represented in image frames. In one or more implementations, the direct access may include direct access, via the display in the low power state, to an application that is also accessible by a swipe gesture input to the display during the wake state of the device. The direct access may be provided when the display is in the low power state and the main processor of the device is inactive (e.g., asleep) or in a media-only low power mode. In one or more implementations, the direct access may include direct access, from the inactive state of the main processor (e.g., from the sleep state of the device), to the wake-state functionality of a button on the device. In one or more implementations, the direct access may include direct access, from the inactive state of the main processor (e.g., from the sleep state of the device), to the wake-state functionality of a watch crown of a smart watch.

In one or more implementations, a device may include one or more co-processors in addition to the main processor corresponding to the user space (e.g., the application processor configured for running applications for the device). Such co-processors can facilitate the direct access to the device functionality. For example, the device may include a first co-processor configured to receive input signals from one or more device sensors and/or components, and a second co-processor (e.g., a display co-processor) configured to operate the display. In one or more implementations, the display co-processor may perform power management operations for the display in the low power state of the display, and/or display driver operations for the display in low power and full power states of the display. In one or more implementations, the display co-processor may facilitate additional device features such as by performing display operations during boot operations and before an operating system of the device is operational.

In one or more implementations, the first co-processor and/or the second co-processor may detect a user input while the device is in a low power state or a sleep state (e.g., in which the application processor is powered down or inactive and the first and/or second co-processors are provided with a reduced operating voltage relative to a normal operating voltage) and/or while the display is in the low power state (e.g., displaying series of pre-stored and/or pre-rendered image frames according to a pre-defined schedule as determined during a prior wake state of the device). The user input may be (as examples) a motion of the device or a gesture corresponding to motion associated with viewing the device display, a touch, tap, press, or swipe of the display, a button push, or a rotation of a crown of a smartwatch. In response to the user input, the first co-processor and/or the second co-processor may cause the main processor to return to a full power (wake) state (e.g., including waking up the user space in cases in which the application processor is asleep), and, while displaying at least a portion of the last displayed image frame of the low power state, cause the main (application) processor to: (i) execute a device function corresponding to the received input and (ii) refresh at least another portion of the image data displayed on the display to correspond to the device function. In this way, the device (e.g., using the display co-processor and/or another co-processor provided for control of a low power state of the display and/or device) can provide direct access to device functionality from an low power state of the display and/or from a low power state of the device.

FIG. 1 illustrates an example network environment 100 for providing direct access to device functionality from an inactive state of a display and/or other low power state of the display, in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes electronic devices 102, 103 and 104 (hereinafter 102-104), a network 106 and a server 108. The network 106 may communicatively (directly or indirectly) couple, for example, any two or more of the electronic devices 102-104 and the server 108. In one or more implementations, the network 106 may be an interconnected network of devices that may include, and/or may be communicatively coupled to, the Internet. For explanatory purposes, the network environment 100 is illustrated in FIG. 1 as including electronic devices 102-104 and a single server 108; however, the network environment 100 may include any number of electronic devices and any number of servers.

One or more of the electronic devices 102-104 may be, for example, a portable computing device such as a laptop computer, a smartphone, a smart speaker, a peripheral device (e.g., a digital camera, headphones), a tablet device, a wearable device such as a smartwatch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 102 is depicted as a smartwatch, the electronic device 103 is depicted as a laptop computer, and the electronic device 104 is depicted as a smartphone. In the example of FIG. 1, electronic device 102 includes button 120 and a crown 121.

Each of the electronic devices 102-104 may be configured to operate in various different power states, with each power state being associated with a respective level of power consumption. In addition, an application (e.g., a clock application) may be executed on the electronic devices 102-104. Moreover, each of the electronic devices 102-104 may be configured to switch between power states in conjunction with updating/refreshing displayed information provided by the application (e.g., the clock application). In one or more implementations, the switching between power states may provide for images to be displayed periodically and/or continuously (e.g., periodic and/or continuous display of time and/or complications), with reduced power consumption (e.g., relative to continuously running in a high power state in which the user space is active for prolonged periods of time). Each of the electronic devices 102-104 may be, and/or may include all or part of, the device discussed below with respect to FIG. 2, and/or the electronic system discussed below with respect to FIG. 10.

The server 108 may be, and/or may include all or part of the electronic system discussed below with respect to FIG. 10. The server 108 may include one or more servers, such as a cloud of servers. For explanatory purposes, a single server 108 is shown and discussed with respect to various operations. However, these and other operations discussed herein may be performed by one or more servers, and each different operation may be performed by the same or different servers. In one or more implementations, one or more of the electronic devices 102-104 may implement the subject system independent of the network 106 and/or independent of the server 108.

Figure 2:
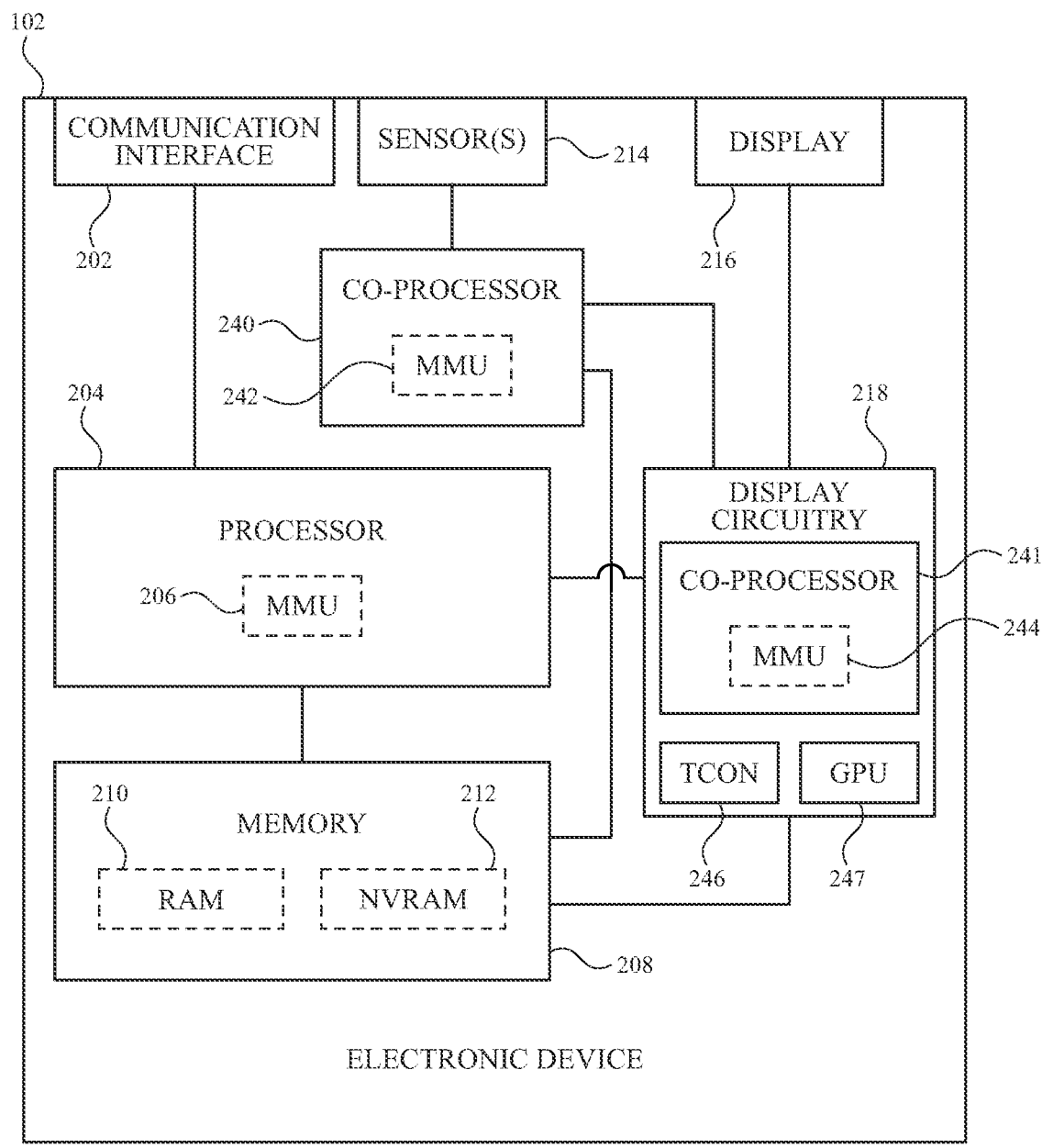
FIG. 2 illustrates an example device that may implement a system for providing direct access to device functionality from a low power state of a device and/or a display of the device, in accordance with one or more implementations.

FIG. 2 illustrates an example device that may implement a system for providing direct access to device functionality from a low power state of a device and/or a display of the device, in accordance with one or more implementations. For explanatory purposes, FIG. 2 is primarily described herein with reference to the electronic device 102. However, FIG. 2 may correspond to any of the electronic devices 102-104 of FIG. 1. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102 may include a communication interface 202, a processor 204 (with an optional a memory management unit (MMU) 206, depicted with dashed lines), a memory 208 (with an optional random access memory (RAM) 210 and/or an optional non-volatile random-access memory (NVRAM) 212, depicted in dashed lines), sensor(s) 214 (e.g., motion sensors such as accelerometers, gyroscopes, or an inertial measurement unit (IMU), global positioning system (GPS) sensors, near-field communications (NFC) sensors, light sensors such as ambient light sensors, and/or other sensors), a co-processor 240 (with an optional a memory management unit (MMU) 242, depicted with dashed lines), display circuitry 218, and/or a display 216.

As shown, display circuitry 218 may include circuitry such as a graphics processing unit (GPU) 247 for processing graphics data generated by processor 204 (e.g., a main processor or an application processor) and circuitry for operation of the pixels of the display 216 based on information provided from processor 204 and/or GPU 247, such as a timing controller 246 and/or other display circuitry not explicitly shown. As shown, display circuitry 218 may also include a co-processor 241 (with an optional a memory management unit (MMU) 244, depicted with dashed lines). Display 216 may be a touch-sensitive display that includes an array of touch-sensitive electrodes and/or pressure sensitive sensors configured to generate touch input signals based on the location, motion, pressure, direction, and/or other features of a touch input to display 216 (e.g., using the user's finger or a touch input device such as a stylus device).

In one or more implementations, the processor 204 may generate or receive data that is to be displayed on the display 216. This display data may be provided to the display circuitry 218 (e.g., such as to co-processor 241). Co-processor 241 may process, scale, modify, and/or otherwise adjust the data for display generate image frames for display (e.g., using timing controller 246 and/or other display circuitry such as column drivers, row drivers, etc. located at display 216 (e.g., on a display panel having display pixels that generate display light for the display). In one or more implementations, co-processor 241 may provide the processed, scaled, modified, and/or adjusted data to GPU 247 to generate image frames for display.

The processor 204 may include suitable logic, circuitry, and/or code that enable processing data and/or controlling operations of the electronic device 102. In this regard, the processor 204 may be enabled to provide control signals to various other components of the electronic device 102. The processor 204 may also control transfers of data between various portions of the electronic device 102. Additionally, the processor 204 may enable implementation of an operating system or otherwise execute code to manage operations of the electronic device 102. For example, processor 204 may be configured to processes operations associated with the operating system of electronic device 102 and for applications running on electronic device 102, including for processing user interactions with an application (e.g., user inputs to an application and/or user outputs from the application).

The memory 208 may include suitable logic, circuitry, and/or code that enable storage of various types of information such as received data, generated data, code, and/or configuration information. The memory 208 may include, for example, the RAM 210, the NVRAM 212, read-only memory (ROM), flash and/or magnetic storage.

In one or more implementations, the memory 208 may store code corresponding to one or more applications (e.g., a clock application, a calendar application, a control center application, a media player application, a messaging application, or any application installed at the device) that can be executed by processor 204. For example, the one or more applications may be implemented as part of an operating system of the electronic device 102. In addition, the one or more applications may store content (e.g., image data) in the memory 208 (e.g., within a data structure such as a queue), and this content may be accessed and displayed on a display of the electronic device 102.

The RAM 210 may correspond to volatile memory, for example, memory that loses its information when power for the electronic device 102 is turned off. While FIG. 2 illustrates the use of RAM as volatile memory, it is possible for the electronic device 102 to use other types of volatile memory instead of or as a supplement to the RAM 210, including but not limited to DRAM, SRAM, T-RAM, Z-RAM, and TTRAM.

Moreover, the NVRAM 212 may correspond to nonvolatile memory, for example, memory configured to retain its information when power for the electronic device 102 is turned off. While FIG. 1 illustrates the use of NVRAM as nonvolatile memory, it is possible for the electronic device 102 to use other types of nonvolatile memory instead of or as a supplement to the NVRAM 212, including but not limited to flash, nvSRAM, FeRAM, FeTRAM, MRAM, PRAM, CBRAM, SONOS, RRAM, NRAM, racetrack memory, FJG, and Millipede memory.

For example, the processor 204 may provide for the mapping of content (e.g., image data) between virtual memory and physical memory (e.g., the RAM 210 and/or the NVRAM 212). Thus, the MMU 206 of the processor 204 may include suitable logic, circuitry, and/or code that enables the mapping of logical addresses (e.g., in virtual memory) to physical addresses (e.g., in the RAM 210 and/or the NVRAM 212).

Processor 204, co-processor 240, and co-processor 241 may share access to common memory, such as memory 208 (e.g., including RAM 210). In one or more implementations, MMU 206, MMU 242, and MMU 244 provide memory maps, respectively, for processor 204, co-processor 240, and co-processor 241 between logical addresses used by each processor/co-processor to physical addresses (e.g., in the RAM 210 and/or the NVRAM 212).

For example, memory 208 may store image data such as a logo image corresponding to a manufacturer of electronic device 102, or a series of images for display during a low power state of display 216. MMU 244 may be arranged (e.g., by processor 204 and/or by a boot loader of the device) to map logical addresses of the image data to physical addresses (e.g., in the RAM 210 and/or the NVRAM 212). In one or more implementations, upon startup of electronic device 102, co-processor 241 may operate display 216 to display the logo image while processor 204 launches an operating system for electronic device 102. In this way, electronic device 102 can immediately display the logo image (e.g., to provide graphical data to indicate to a user that the device is powering on) before the operating system of electronic device 102 is operational.

Processor 204 may be a main processor for electronic device 102 that manages the memory map corresponding to MMU 206 for its own use, and also manages the memory maps corresponding to MMU 242, and/or 244. In one or more implementations, co-processors 240 and 241 have read access, respectively, to memory maps corresponding to MMU 242 and MMU 244, but do not have write access to the memory maps corresponding to MMU 242 or MMU 244.

The sensor(s) 214 may include one or more motion sensor(s), such as an accelerometer, a gyroscope, an optical sensor, and the like. These sensor(s) 214 may be used to facilitate movement and orientation related functions of the electronic device 102, for example, to detect movement, direction, and orientation of the electronic device 102. In one or more implementations, output from the motion sensor(s) may be used to determine different motion states associated with a motion of the device (e.g., a raise gesture such as a wrist-raise gesture and/or a down gesture such as wrist-down gesture) of the electronic device 102.

In one or more implementations, the sensor(s) 214 may include an ambient light sensor. For example, the ambient light sensor may include a photodetector configured to detect the amount and/or color of ambient light. During a wake state of electronic device 102, processor 204 and/or co-processor 241 may adjust the display brightness and/or the color of displayed images for display 216 based on the detected amount and/or color of ambient light. During a low power state of display 216 (e.g., in which a series of pre-generated images indicating time are being displayed by display 216 to reduce power consumed by the display), and/or while processor 204 is inactive, co-processor 240 may receive ambient light signals from sensor(s) 214.

In one or more implementations, while processor 204 is inactive, co-processor 240 may determine whether the ambient light signals exceed an upper threshold or fall below a lower threshold for causing a change in the brightness and/or color of the images being displayed by display 216 in the low power state of the display. Responsive to a determination that the ambient light signals exceed an upper threshold or fall below a lower threshold for causing a change in the brightness and/or color of the images being displayed by display 216, co-processor 240 may forward the ambient light signals and/or ambient light information based on the ambient light signals to co-processor 241 of display circuitry 218.

Responsive to receiving the ambient light signals from co-processor 240 during the low power state of the display, co-processor 241 may generate and/or apply one or more brightness and/or color changes to the displayed images of the low power state.

In one or more implementations, it is possible that display pixel(s) may be positioned on top of the ambient light sensor. These pixels may produce light which may potentially interfere with the ambient light sensor's ability to detect ambient light. Thus, the processor 204 and/or co-processor 241 may be configured to determine which pixels are in a position to potentially interfere with the ambient light sensor and/or to adjust output of the ambient light sensor accordingly. For example, the adjustment of ambient light sensor output may be based on weighted values assigned to the pixel(s) based on their respective position and/or light characteristics (e.g., brightness, color and the like).

In one or more implementations, processor 204 may notify co-processor 240 and/or co-processor 241 when electronic device 102 is about to enter a low power state (e.g., when processor 204 is about to be inactivated). In one or more implementations, processor 204 of electronic device 102 may enter the low power or inactive state without notification to co-processor 240 and/or co-processor 241. In these implementations, co-processor 240 and/or co-processor 241 may determine (e.g., by detecting a reduced operating voltage being provided thereto) that the device has entered to the low power state (e.g., that the device is asleep). Responsive to the notification or the determination that the device has entered the low power state, co-processor 241 may operate the display 216 according to the low power state. For example, in a reduced power state of electronic device 102 (corresponding to the low power state of display 216 and/or an inactive state of processor 204), co-processor 241 may operate display 216 to display a pre-generated series of images corresponding to future times while preventing operation of display 216 at a brightness, or to display an image, that would violate a power constraint corresponding to the low power mode. Operating the display according to the low power state may include limiting an average pixel luminance, turning off scaling circuitry, and/or pinning the display refresh rate to a rate that is lower than a normal refresh rate (e.g. 60 Hz).

The communication interface 202 may include suitable logic, circuitry, and/or code that enables wired or wireless communication, such as between any of the electronic devices 102-104 and the server 108 over the network 106. The communication interface 202 may include, for example, one or more of a Bluetooth communication interface, a cellular interface, an NFC interface, a Zigbee communication interface, a WLAN communication interface, a USB communication interface, or generally any communication interface.

In one or more implementations, one or more of the communication interface 202, the processor 204, the MMU 206, the memory 208, the RAM 210, the NVRAM 212, the sensor(s) 214, the co-processor 240, the MMU 242, the display 216, the display circuitry 218 and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
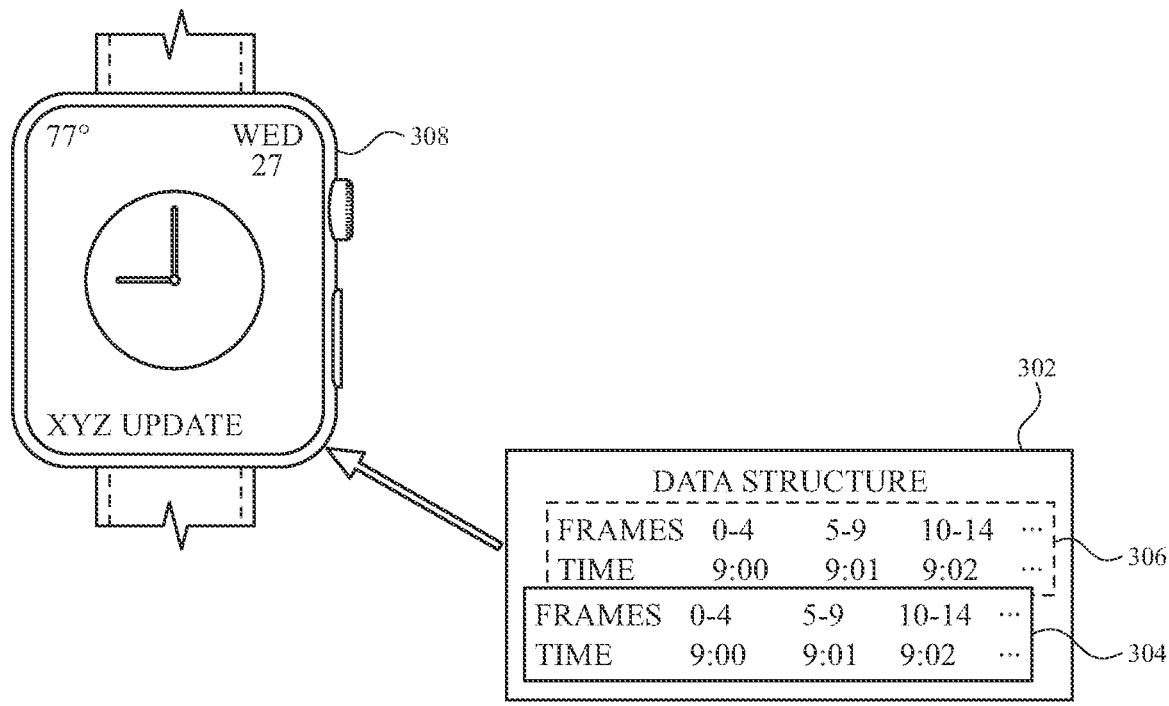
FIG. 3 illustrates an example of a data structure for displaying an image in accordance with one or more implementations.

FIG. 3 illustrates an example of a data structure 302 for displaying an image in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

In one or more implementations, the data structure 302 may store pairs of image frame(s) with scheduled display times. The electronic device 102 (e.g., co-processor 241) may be configured to access the data structure 302 in order to display the image frame(s) at their respective scheduled display times. In one or more implementations, the data structure 302 is implemented as a queue.

In one or more implementations, the data structure 302 may be generated during a wake state of the electronic device 102 (e.g., during which the processor 204 is active). During a subsequent low power state (e.g., during which the processor 204 is in a low power or inactive state), the co-processor 241 may retrieve the image frames from the data structure 302 based on the scheduled display times. In order to update the display 216 during the low power state of the display and/or the low power state or inactive state of processor 204, co-processor 241 may retrieve an updated image from the framebuffer and display the retrieved image data on the display 216.

In the example of FIG. 3, the data structure 302 includes a first queue 304 and a second queue 306. The second queue 306 may be an optional queue, as illustrated by dashed lines. The first queue 304 includes image frames (e.g., identified as 0-4, 5-9, 10-14) and scheduled display times (e.g., 9:00, 9:01, 9:02). In one or more implementations, the first queue 304 (e.g., and/or the second queue 306) stores identifiers (e.g., memory addresses) corresponding to the image frames. In the example of FIG. 3, the image frames include first image frames 0-4 scheduled for display at a time 9:00, second image frames 5-9 scheduled for display at a time 9:01, third image frames 10-14 scheduled for display at a time 9:02, and the like. The example of FIG. 3 illustrates five image frames per display time. However, the number of image frames per time period may be a value other than five (e.g., one or more image frames per display time). In the example of FIG. 3, a first image frame 308 corresponding to Frame 0 of first queue 304 (e.g., corresponding to an image displaying a time of (9:00) is shown (e.g., as would be displayed by display 216 of FIG. 2). For example, the image frame 308 may correspond to an image frame for display on a smart phone or a smartwatch, including a graphical element to display the current time (e.g., as shown by clock hands in the example of FIG. 3). In addition, the image frame 308 may include one or more complications (e.g., functions other than the display of the time) including, but not limited to: weather (e.g., temperature of "77°"), date (e.g., day of week/month of "Wed 27"), third party data (e.g., "XYZ update") and the like.

In one or more implementations, the electronic device 102 may be configured to receive data for the complications corresponding to third party applications during a wake state of the device. For example, the third party applications may provide data/image frames and/or display times for populating the data structure 302. The electronic device 102 may be configured with the appropriate protocols and/or interfaces to receive such data from the corresponding third-party services (e.g., where the data is obtained locally from the memory 208 and/or remotely from the server 108), and update the data structure 302 (e.g., via the first queue 304 and/or the second queue 306) accordingly during the wake state of the device.

In one or more implementations, the scheduled display times (e.g., 9:00, 9:01, 9:02 and the like) may coincide with updates to one or more of display field(s) during the low power state of the display. For example, the data structure 302 may include image frames 5-9 for updating at time 9:01, the clock hand (e.g., the minutes hand), relative to image frames 0-4 at time 9:00. The image frames may further indicate any future updates to the one or more of the complications (e.g., weather, date and/or third party data). However, the image frames 5-9 may be generated, for example, for the time 9:01 prior to the current time reaching 9:01.

When transitioning from time 9:00 to 9:01 during the low power state of the display, the image frames 5-9 may provide an animation effect for the updated image. For example, the image frames 5-9 may provide for a smoother perceived movement of the clock hand (e.g., the minutes hand) when transitioning from the time 9:00 to 9:01 during the low power state of the display.

In one or more implementations, the electronic device 102 may provide for reducing an amount of redundant image data stored in physical memory. For example, the data structure 302 may provide for storing differences (e.g., corresponding to updates) between image frames in physical memory, and using virtual memory to store image data that does not change between image frames.

As noted above with respect to FIG. 2, the electronic device 102 may implement virtual memory and physical memory. In one or more implementations, the virtual memory may be a logical component accessible by a kernel of an operating system running on the electronic device 102. In general, the virtual memory may simulate main memory (e.g., the RAM 210) by utilizing nonvolatile memory (e.g., the NVRAM 212) as temporary storage. The MMU 206, MMU 242, and/or MMU 244 may provide for mapping of logical addresses (e.g., in virtual memory) to physical addresses (e.g., in the RAM 210 and/or the NVRAM 212).

In one or more implementations, the electronic device 102 (e.g., the kernel of the operating system) may provide for the virtual memory to re-map to portions of the same physical memory multiple times. For example, if part of an image frame does not change over multiple time intervals (e.g., the display times 9:00, 9:01, 9:02), those image frames may have multiple different logical addresses referring to the same portion(s) in physical memory where the part of the image frame is stored. In other words, different logical addresses may be mapped (e.g., using the MMU 206, MMU 242, and/or MMU 244) to the same physical address for a part of an image frame that does not change. Thus, the electronic device 102 may use re-mapping with respect to virtual memory in order to reduce the amount of image data that is stored in physical memory at any given time.

Moreover, in one or more implementations, the electronic device 102 may use an image composition tool (e.g., a glyph-based tool) that can be executed, for example by co-processor 241 to reduce the amount of image data that is stored with respect to the data structure 302. The image composition tool may be configured to generate an image (e.g., a clock face, a watch complication) based on one or more parameters which describe the image. For example, with respect to the image frame 308, the parameters may indicate a time (e.g., or a position of clock hands), a temperature value, a day of the week/month value, a third-party update value, and/or other parameters for display characteristics (e.g., color, position, size and the like).

The image composition tool may use these parameters in order to generate the images at respective times (e.g., 9:00, 9:01, 9:02 and the like). The image frames (e.g., 0-4, 5-9, 10-14) in the first queue 304 may store these parameters, instead of or as a supplement to, actual image data (e.g., pixels). In one or more implementations, the kernel of the operating system and/or hardware components (e.g., the display circuitry 218) of the electronic device 102 may provide for generating the images (e.g., including image frame 308) based on the image composition tool. In one or more implementations, the co-processor 241 may be configured to generate the images during the low power state of the display based on the image composition tool, e.g., without the processor 204 needing to be powered on and/or to be in a high power mode.

With respect to the second queue 306 (e.g., an optional queue), the electronic device 102 may be configured to compose images using more than one image layer. Each image layer may be displayed based on a respective memory buffer (e.g., with image frames and display times) for that image layer. For example, the electronic device 102 (e.g., the processor 204) may be configured to generate a first image layer of image data based on a first memory buffer (e.g., the first queue 304), and to generate a second image layer of image data based on a second memory buffer (e.g., the second queue 306) during a wake state of the device. In one or more implementations, the electronic device 102 (e.g., the co-processor 241) may be configured to merge the first and second image layers of image data into a single image for display (e.g., corresponding to the image frame 308) during the low power state of the display. As such, the combined result may not be stored in the memory 208, and may simply be provided for display on the display 216. For example, the first queue 304 may include the image data for an overall appearance of the clock (e.g., with the exception of the clock hands), as well as the various complications (e.g., the weather, day of week/month, and third-party update). The second queue 306 may include the image data limited to the clock hands. For example, based on different environmental settings and/or signals (e.g., based on ambient light signals provided to co-processor 241 from co-processor 240 during a low power state of the display), the brightness of the clock hands relative to the background (e.g., where the background corresponds to the remainder of the clock and watch complications) can be changed (e.g., the clock hands are brighter in a well-lit environment, and/or the background is brighter in a low-lit environment) without waking processor 204 (e.g., using co-processor 241).

In one or more implementations, one or more of components of the data structure 302, the first queue 304 and/or the second queue 306 are implemented as software instructions, stored in the memory 208, which when executed by the processor 204, cause the co-processor 241 to perform particular function(s).

In one or more implementations, one or more of components of the data structure 302, the first queue 304 and/or the second queue 306 may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices), and/or a combination of both. In one or more implementations, some or all of the depicted components may share hardware and/or circuitry, and/or one or more of the depicted components may utilize dedicated hardware and/or circuitry. Additional features and functions of these modules according to various aspects of the subject technology are further described in the present disclosure.

In one or more implementations, during a low power state of electronic device 102 (e.g. while image frame 308 is displayed using co-processor 241 and/or while processor 204 is in a low power or inactive state), co-processor 240 and/or co-processor 241 may be configured to detect a user interaction with electronic device 102. When a user input is detected by co-processor 240 and/or co-processor 241 while processor 204 is in a low power or inactive state, co-processor 240 and/or co-processor 241 can provide direct access to functionality corresponding to that user input (e.g., without requiring a wake-up input and a subsequent and separate selection input to select the functionality).

Figure 4:
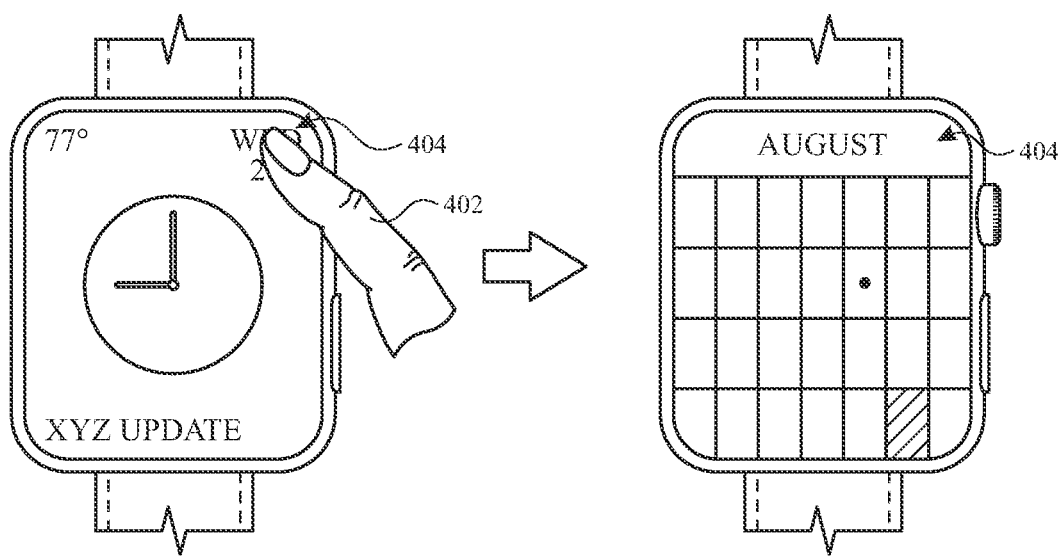
FIG. 4 illustrates direct access to an application associated with a complication displayed in an image frame in a low power state of a display in accordance with one or more implementations.

For example, FIG. 4 illustrates an example in which, while electronic device 102 is in an low power state (e.g., while processor 204 is inactive, and/or while co-processor 241 operates display 216 to display images from a pre-generated data structure as described above), co-processor 240 and/or co-processor 241 detect a tap input (e.g., by a user's finger 402 or by a stylus or other input device) at the location 400 of a displayed calendar complication. Without the ability (e.g., provided by co-processor 240 and/or co-processor 241) to determine the location of the tap input, a sleeping device or a device with a display in a low power state may respond to any user input as an instruction to wake the processor 204, to brighten the display of image frame 308 to indicate wake-up of the device, and to prepare to detect and receive a subsequent input for control of the device. However, co-processor 240 and/or co-processor 241 may facilitate direct access to the functionality of the device corresponding to the location 400 of the watch complication without further input from the user (e.g., without a subsequent input that follows a touch release event associated with the initial tap during the low power or sleep state).

For example, responsive to a detection (e.g., by co-processor 240 and/or co-processor 241) of a user tap at location 400 as illustrated in FIG. 4, co-processor 240 and/or co-processor 241 may generate and provide a message to processor 204 to wake up and immediately activate a calendar application 404 (e.g., without a further user input associated with the calendar complication, without an intervening touch release detection between the user tap an a further user input, and without an intervening brightness increase for image frame 308 to indicate wake-up). In this way, electronic device 102 may provide a "snappier" response to user inputs received during a low power state, as the device doesn't appear to wake up and then respond to the user, but instead appears to directly respond as if it had been awake. In this way, direct access, from the low power state of the display and/or an inactive state of processor 204, can be provided to an application corresponding to a complication represented in image frames displayed during the low power/inactive state. In contrast, a tap (e.g., detected by co-processor 240 and/or co-processor 241) at another location on the display of electronic device 102 (e.g., at a location away from any displayed complications or other functional locations) during the low power state of the display may cause the processor 204 to wake up without activating other functionality of the device (e.g., until a subsequent user input is received during the resulting wake state).

Electronic device 102 may also provide direct access, from the low power state of the display and/or an inactive state of processor 204, to an application that would be accessible by a swipe gesture input to the display during the wake state of the device. For example, in one or more implementations, a new functionality or a new application can be accessible by a swipe across the face of display of an electronic device, depending on the direction of the swipe. For example, in some implementations, a swipe up from a bottom of a display or a swipe down from a top of the display may activate a control center application, a notification center application, or an unlock application, and cause a corresponding new user interface to appear to slide over the image frame 308 in a direction of the swipe. In another example, a swipe to the right from a left edge of the display or a swipe to the left from a right edge of the display may cause a clock application to display a new user interface. Without the ability (e.g., provided by co-processor 240 and/or co-processor 241) to determine the location, direction, and/or type of a swipe input, a sleeping device may respond to any user input (e.g., including a swipe) as a generic instruction to wake the processor 204, to brighten the display of image frame 308 to indicate wake-up of the device, and to prepare to detect and receive a subsequent input for control of the device (e.g., a subsequent input that follows a touch release event associated with the initial swipe during the sleep state). However, co-processor 240 and/or co-processor 241 may facilitate direct access to the functionality of the device corresponding to the location and direction of a swipe received during the low power state of the device (e.g., while processor 204 is disabled and image frame 308 is displayed).

Figure 5:
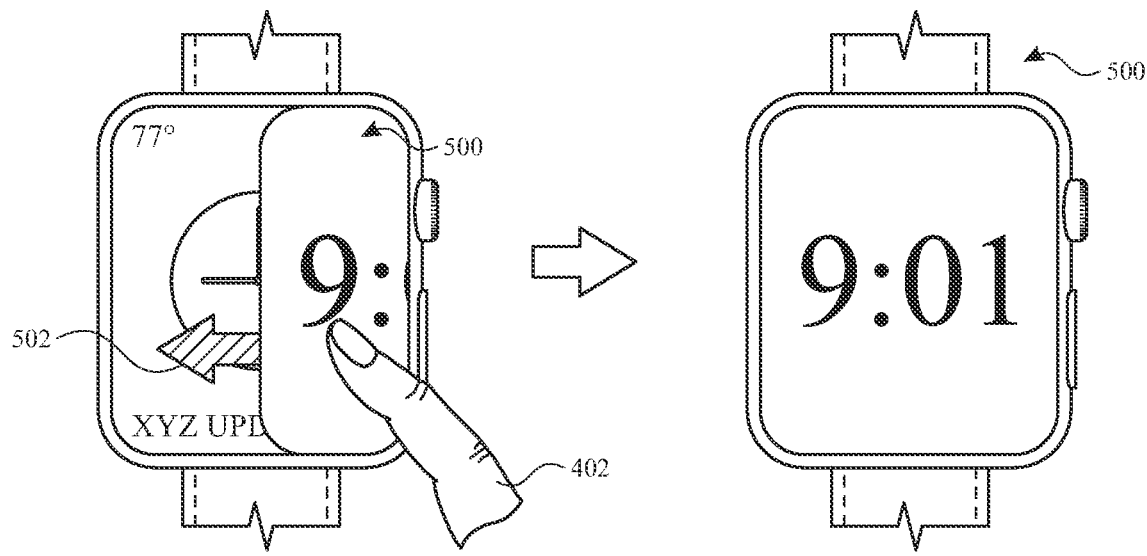
FIG. 5 illustrates direct access to an application associated with a swipe input to a display in a low power state in accordance with one or more implementations.

FIG. 5 illustrates an example, in which a swipe input (e.g., by a finger 402 or another input device) to the left (as indicated by arrow 502) is received to pull a new user interface 500 for the clock application over the displayed image frame 308. In one or more implementations, co-processor 240 and/or co-processor 241 may provide (e.g., responsive to the swipe input received in the low power or inactive state) a message to processor 204 to wake up and immediately activate the clock application (e.g., without a further user input associated with the clock application, without an intervening touch release detection between the user swipe and a further user input, and without an intervening brightness increase for image frame 308 to indicate wake-up).

For example, image frame 308 may remain unchanged while the new user interface 500 is pulled over image frame 308 and while processor 204 powers on and activates the clock application. In this way, electronic device 102 may provide an new user interface 500 that is active, for interaction by the user with the active clock application, by the time the new user interface 500 is fully displayed. In the example of FIG. 5, the new user interface 500 includes a digital time display without any other complications. However, this is merely illustrative and the new user interface may include complications and/or other features as described herein. Although the example of FIG. 5 is described in connection with a side-to-side swipe and a clock application, it should be appreciated that direct access can be provided, from the low power state of the device, to a control center application, a notifications application, an unlock application, and/or any other application or functionality that would be associated with a swipe input during a wake state of the device.

Figure 6:
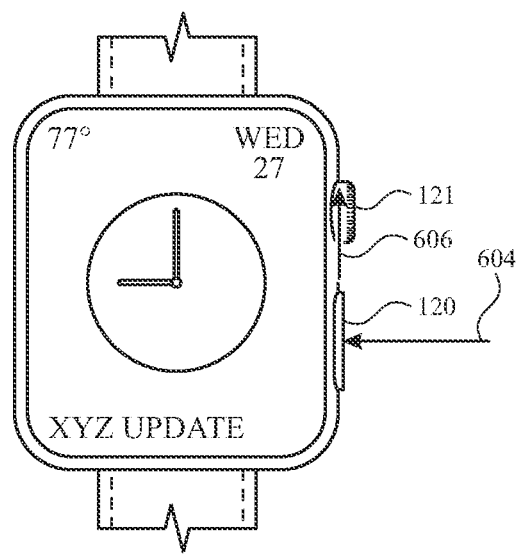
FIG. 6 illustrates direct access to function of a button or a crown of a smartwatch from a low power state of a device in accordance with one or more implementations.

FIG. 6 illustrates an example in which electronic device 102 includes a button 120 and a crown 121. During a wake state of electronic device 102, a press of button 120 (e.g., as indicated by arrow 604) may cause display of a user interface of a contacts application or a recent activity user interface, or another user interface. Without the ability (e.g., provided by co-processor 240 and/or co-processor 241), to identify the button press, a sleeping device (e.g., electronic device 102 in a low power state with an inactive processor 204 and a display 216 in a low power state) may respond to a button push as a generic instruction to wake the processor 204, to brighten the display of image frame 308 to indicate wake-up of the device, and to prepare to detect and receive a subsequent input for control of the device (e.g., a subsequent button push or other subsequent user input). However, co-processor 240 and/or co-processor 241 may facilitate direct access to the functionality of the button 120 responsive to a button push received during the low power state of the device (e.g., while processor 204 is inactive and/or image frame 308 is displayed).

In one or more implementations, co-processor 240 and/or co-processor 241 may provide a message to processor 204 to wake up and immediately activate the application and/or other functionality associated with button 120 (e.g., without a further push of button 120, and without an intervening brightness increase for image frame 308 to indicate wake-up). For example, image frame 308 may remain unchanged until the user interface corresponding to the button push is provided (e.g., by processor 204) to replace image frame 308. In this way, in one or more implementations, the direct access can also be provided, from the inactive state of the device, to the wake-state functionality of a button on the device.

In one or more implementations, a sleeping device (e.g., electronic device 102 in a low power state with an inactive processor 204) may respond to a rotation of a crown such as crown 121 by brightening or dimming the displayed image frame 308. In one or more implementations, co-processor 240 and/or co-processor 241 may determine whether a rotation of crown 121 (e.g., as indicated by arrow 606) during the low power state of the device exceeds a threshold (e.g., a threshold number of degrees (e.g., a threshold of fifteen degrees, thirty degrees, sixty degrees, or ninety degrees of rotation)) while processor 204 is inactive and image frame 308 is displayed. Responsive to determining that the rotation has exceeded the threshold, co-processor 240 and/or co-processor 241 may provide a message to processor 204 to wake up and perform a function corresponding to the crown (e.g., control of a part of a displayed user interface or control of an aspect of another application such as control of a volume of playback of a media player application) without an additional and separate rotation of crown 121 after wake-up, and without an intervening brightness increase for image frame 308 to indicate wake-up. In this way, in one or more implementations, the direct access may include direct access, from the inactive state, to the wake-state functionality of a watch crown of a smartwatch.

Figure 7:
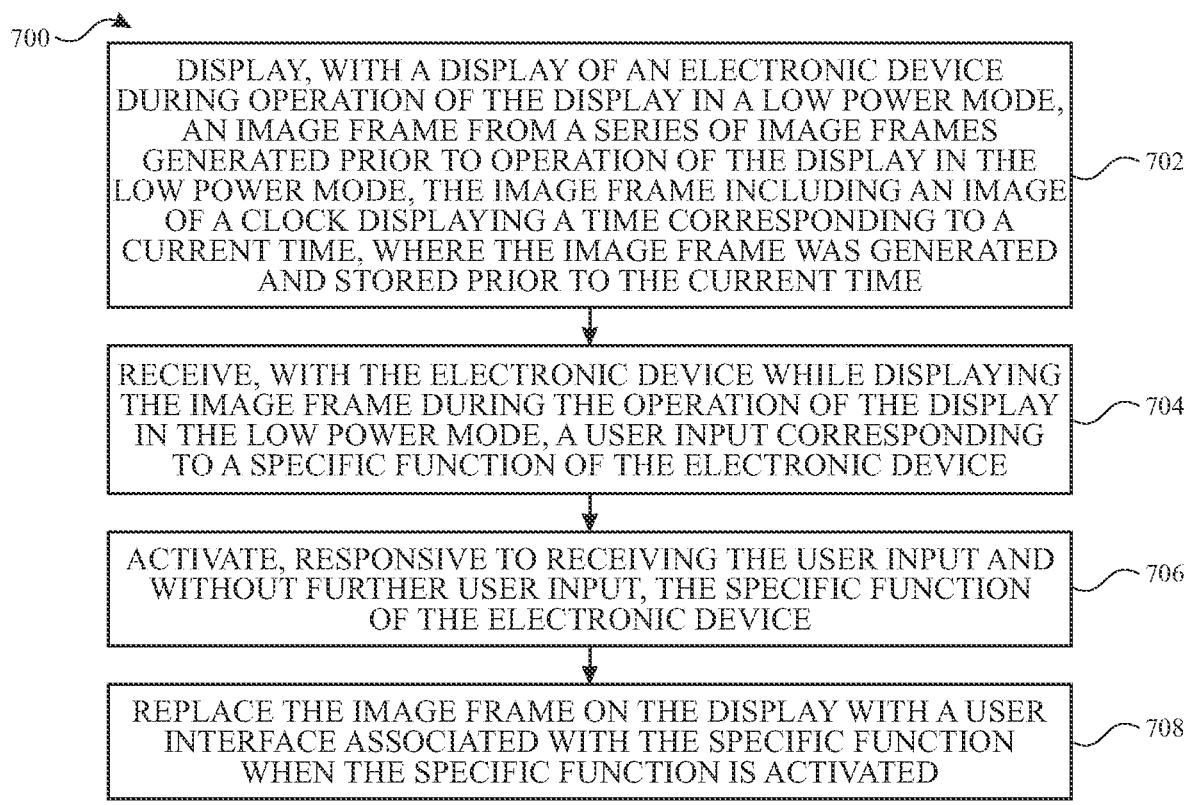
FIG. 7 illustrates a flow diagram of an example process for direct access to functionality of a device from a low power state in accordance with one or more implementations.

FIG. 7 illustrates a flow diagram of an example process for direct access to device functionality for a device with a display in a low power state in accordance with one or more implementations. For explanatory purposes, the process 700 is primarily described herein with reference to the electronic device 102 of FIG. 1. However, the process 700 is not limited to the electronic device 102 of FIG. 1, and one or more blocks (or operations) of the process 700 may be performed by one or more other components and other suitable devices (e.g., any of the electronic devices 102-104). Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

At block 702, a display (e.g., display 216) of an electronic device (e.g., electronic device 102) displays, during operation of the display in a low power mode, an image frame (e.g., image frame 308) from a series of image frames generated prior to operation of the display in the low power mode, where the image frame includes an image of a clock displaying a time corresponding to a current time, and where the image frame was generated and stored prior to the current time. For example, as described above in connection with FIG. 3, image frame 308 displays a time of 9:00, and was generated (e.g., by processor 204) at a time prior to 9:00 for future display when the current time is 9:00.

In one or more implementations, displaying the image frame may include displaying the image frame with a co-processor (e.g., co-processor 241) of the electronic device that is separate from a processor (e.g., processor 204) of the electronic device. The processor may generate the series of image frames prior to the co-processor operating the display in the low power mode. The processor may also store the series of image frames in memory (e.g., memory 208) of the electronic device. The processor and the co-processor may be configured to share access to the memory. The co-processor may access the series of image frames, while operating the display in the low power mode, using a memory map (e.g., MMU 244) for the co-processor that has been prepared or arranged by the processor.

In one or more implementations, prior to displaying the image frame with the co-processor, the co-processor may detect a low power state of the processor. The co-processor may also manage, during the low power state of the processor, power consumption by the display. Managing the power consumption by the display may include controlling a frame rate, a voltage, and/or a brightness (luminance) of the display during display of the image frame, based on a power budget for the display during the operation in the low power mode for the display. For example, managing the power consumption of the display may include, with the co-processor, deactivating a self-refresh function of the display, and pinning the refresh rate to a low power refresh rate that is lower than a normal refresh rate. For example, the low power refresh rate may be less than 60 Hz, less than 30 Hz, less than 10 Hz, less than 2 Hz, or 1 Hz.

At block 704, the electronic device receives, while displaying the image frame during the operation of the display in the low power mode, a user input corresponding to a specific function of the electronic device.

At block 706, responsive to receiving the user input and without further user input, the specific function of the electronic device is activated. In one or more implementations, the image frame includes an indication of a current time and a complication (e.g., a calendar complication, a weather complication, a third party complication, or another complication associated with an application or function of the device), the specific function includes an application associated with the complication, and the user input includes a touch input at a location of the complication in the image frame (e.g., a tap on a touch sensitive portion of the display at which the complication is displayed). Activating the specific function of the electronic device may include providing an instruction to a processor (e.g., a main or application processor such as processor 204) of the electronic device, while displaying the image frame, to (e.g., wake up and) activate the application. Providing the instruction to the processor of the electronic device, while displaying the image frame, to activate the application, may include continuing to display the image frame without modification of a brightness of the display during the activation of the application.

In one or more implementations, the user input may include a swipe on the display, and the specific function may include an application associated with the swipe (e.g., as described above in connection with FIG. 5). Activating the specific function of the electronic device may include providing an instruction to a processor of the electronic device, while displaying the image frame, to (e.g., wake up and) activate the application.

In one or more implementations, displaying the image frame during operation of the display in the low power mode may include displaying the image frame during a low power mode of a processor (e.g., processor 204) of the electronic device in which the processor runs (e.g., only) a media player application in the low power mode. In one or more implementations, displaying the image frame during operation of the display in the low power mode may include displaying, while a processor of the electronic device is inactive (e.g., while the electronic device is in a sleep state), the processor being configured to run applications for the electronic device (e.g., when the processor is active in a wake state for the device). In one or more implementations, the user input may include a press of a button (e.g., button 120) of the electronic device, and activating the specific function may include providing, without further user input to the electronic device (e.g., without an additional subsequent push of the button), an instruction to the processor of the electronic device to wake up and execute a function corresponding to the button (e.g., as described above in connection with FIG. 6). In one or more implementations, the user input may include a rotation of a crown (e.g., crown 121) of the smartwatch, and activating the specific function may include providing, without further user input to the electronic device, an instruction to the processor of the electronic device to wake up and execute a function corresponding to the rotation of the crown (e.g., as described above in connection with FIG. 6).

At block 708, the image frame on the display is replaced with a user interface associated with the specific function, when the specific function is activated. The specific function may be activated when the main processor of the device is active and executing the specific function. In one or more implementations, replacing the image frame with the user interface may include displaying a user interface of an application with the processor of the electronic device (e.g., as shown in the example of FIG. 4). In one or more implementations, replacing the image frame on the display with the user interface associated with the specific function when the specific function is activated may include, while displaying a portion of the image frame without modifying a brightness of the portion of the image frame, progressively displaying an increasing portion of the user interface, increasing in a direction of a swipe (e.g., as shown in the example of FIG. 5).

Figure 8:
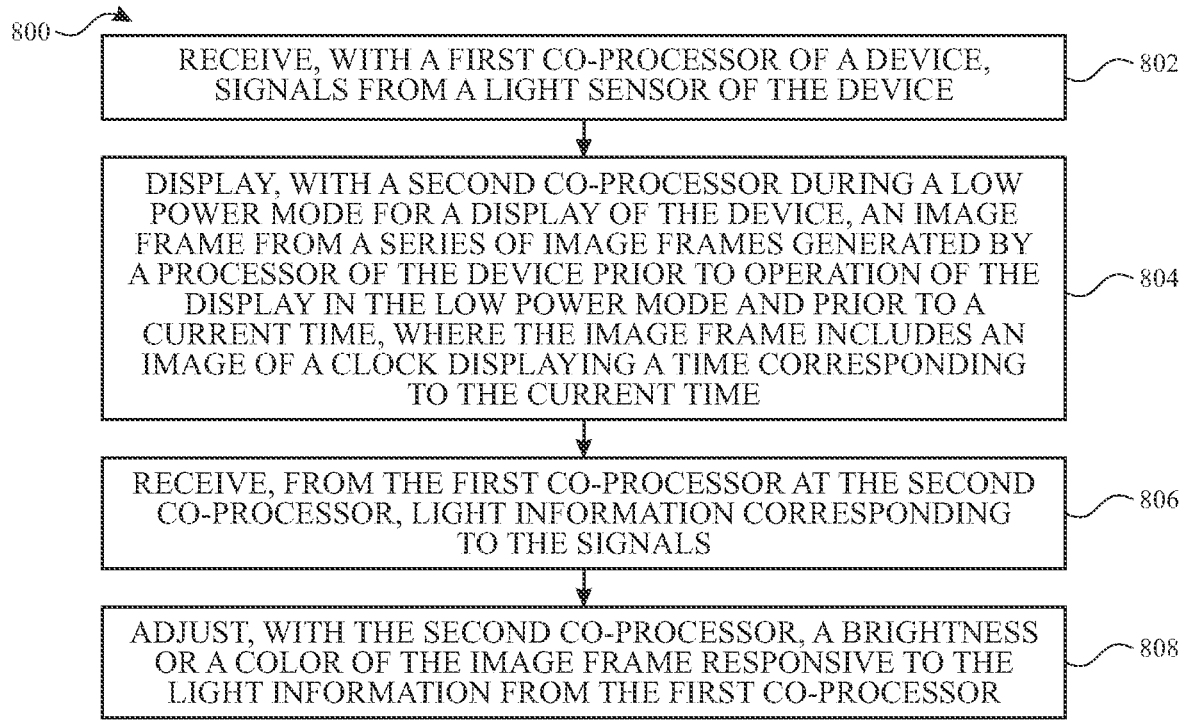
FIG. 8 illustrates a flow diagram of an example process for light sensing for a device in a low power state in accordance with one or more implementations.

FIG. 8 illustrates a flow diagram of an example process for light sensing by a device in a low power state in accordance with one or more implementations. For explanatory purposes, the process 800 is primarily described herein with reference to the electronic device 102 of FIG. 1. However, the process 800 is not limited to the electronic device 102 of FIG. 1, and one or more blocks (or operations) of the process 800 may be performed by one or more other components and other suitable devices (e.g., any of the electronic devices 102-104). Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

At block 802, a first co-processor (e.g., co-processor 240) of a device (e.g., electronic device 102) may receive signals from a light sensor (e.g., an ambient light sensor of sensor(s) 214) of the device.

At block 804, a second co-processor (e.g., co-processor 241) may display, during a low power mode for a display (e.g., display 216) of the device, an image frame (e.g., image frame 308) from a series of image frames generated by a processor (e.g., processor 204) of the device prior to operation of the display in the low power mode and prior to a current time. The image frame may include an image of a clock displaying a time corresponding to the current time (e.g., as described above in connection with FIGS. 3-6). The processor may be configured to run applications for the device.

At block 806, the second co-processor may receive, from the first co-processor, light information corresponding to the signals. The first co-processor may compare the signals from the light sensor to a threshold, and provide the light information corresponding the signals to the second co-processor if the signals exceed the threshold (e.g., if the signals indicate ambient light above an upper threshold or ambient light below a lower threshold).

At block 808, the second co-processor may adjust a brightness or a color of the image frame responsive to the light information from the first co-processor. The second co-processor may receive the light information from the first co-processor and adjust the brightness or the color of the image frame while the processor is inactive. In one or more implementations, the device includes memory (e.g., memory 208), and the processor, the first co-processor, and the second co-processor each have access to the memory. The device may also include a first memory map (e.g., MMU 206) for the processor, a second memory map (e.g., MMU 242) for the first co-processor, and third memory map (e.g., MMU 244) for the second co-processor. The first memory map, the second memory map, and the third memory map each map logical addresses to physical addresses in the memory. In one or more implementations, the processor is configured to manage the first memory map, the second memory map, and the third memory map (e.g., without management by the first and second co-processors for consistency of the memory maps used by all processors/co-processors).

Figure 9:
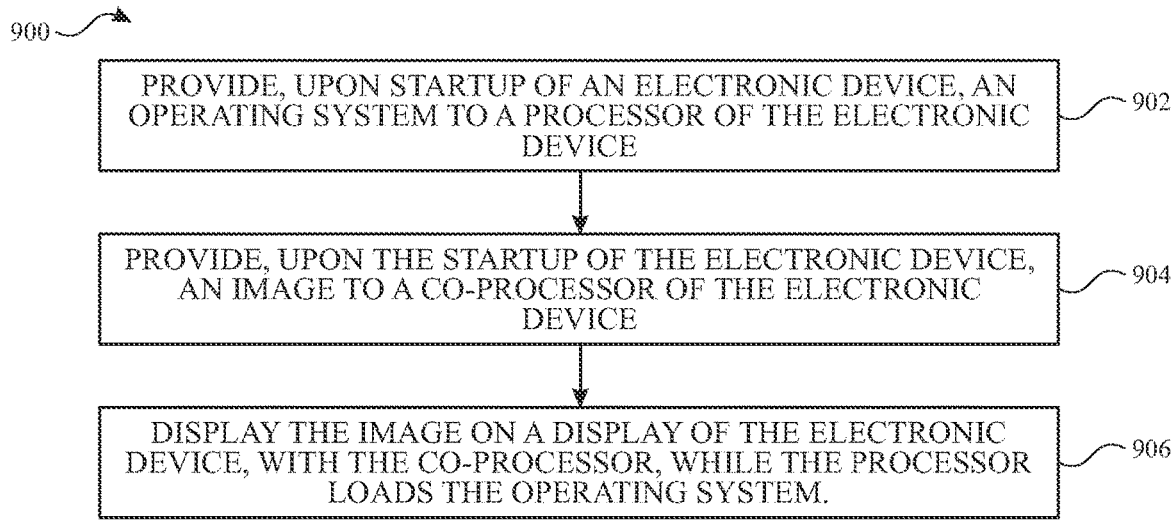
FIG. 9 illustrates a flow diagram of an example process for boot process for a device in accordance with one or more implementations.

FIG. 9 illustrates a flow diagram of an example process for boot operations for a device in accordance with one or more implementations. For explanatory purposes, the process 900 is primarily described herein with reference to the electronic device 102 of FIG. 1. However, the process 900 is not limited to the electronic device 102 of FIG. 1, and one or more blocks (or operations) of the process 900 may be performed by one or more other components and other suitable devices (e.g., any of the electronic devices 102-104). Further for explanatory purposes, the blocks of the process 900 are described herein as occurring in serial, or linearly. However, multiple blocks of the process 900 may occur in parallel. In addition, the blocks of the process 900 need not be performed in the order shown and/or one or more blocks of the process 900 need not be performed and/or can be replaced by other operations.

At block 902, upon startup of an electronic device, an operating system is provided (e.g., by a boot loader) to a processor (e.g., processor 204) of the electronic device. Providing the operating system to the processor may include, for example, copying at least a portion of the operating system from NVRAM 212 or other non-volatile memory of memory 208 to RAM 210 for access by the processor.

At block 904, upon the startup of the electronic device, an image (e.g., a logo image such as a logo image including a logo associated with a manufacturer of the electronic device) is provided (e.g., by the boot loader) to a co-processor (e.g., co-processor 241) of the electronic device. Firmware stored at the electronic device may also be provided to the co-processor by the boot loader, the firmware including instructions for displaying the image.

At block 906, the co-processor may display the image on a display (e.g., display 216) of the electronic device, while the processor loads the operating system. In this way, an image such as a logo image can be displayed by the display of the device even before the operating system of the device is operational.

After loading of the operating system by the processor, additional image information for display in place of the image may be received, at the co-processor, from the processor. The additional image information may include graphical information for user interface of an operating system or other application running at the device. In one or more implementations, once the operating system is running on the processor, the processor may generate a data structure (e.g., a data structure 302 of FIG. 3) including a set of image frames. The processor may then be inactivated for a sleep state of the electronic device. The set of image frames previously generated by the processor may then be displayed with the co-processor while the electronic device is in the sleep state (e.g., or while the processor is in a low power state running only a media player application).

The present disclosure recognizes that the use of personal information data, in the present technology, can be used to the benefit of users. For example, the personal information data can be used for displaying image data. Accordingly, use of such personal information data may facilitate transactions (e.g., on-line transactions). Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/ sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of displaying image data, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Figure 10:
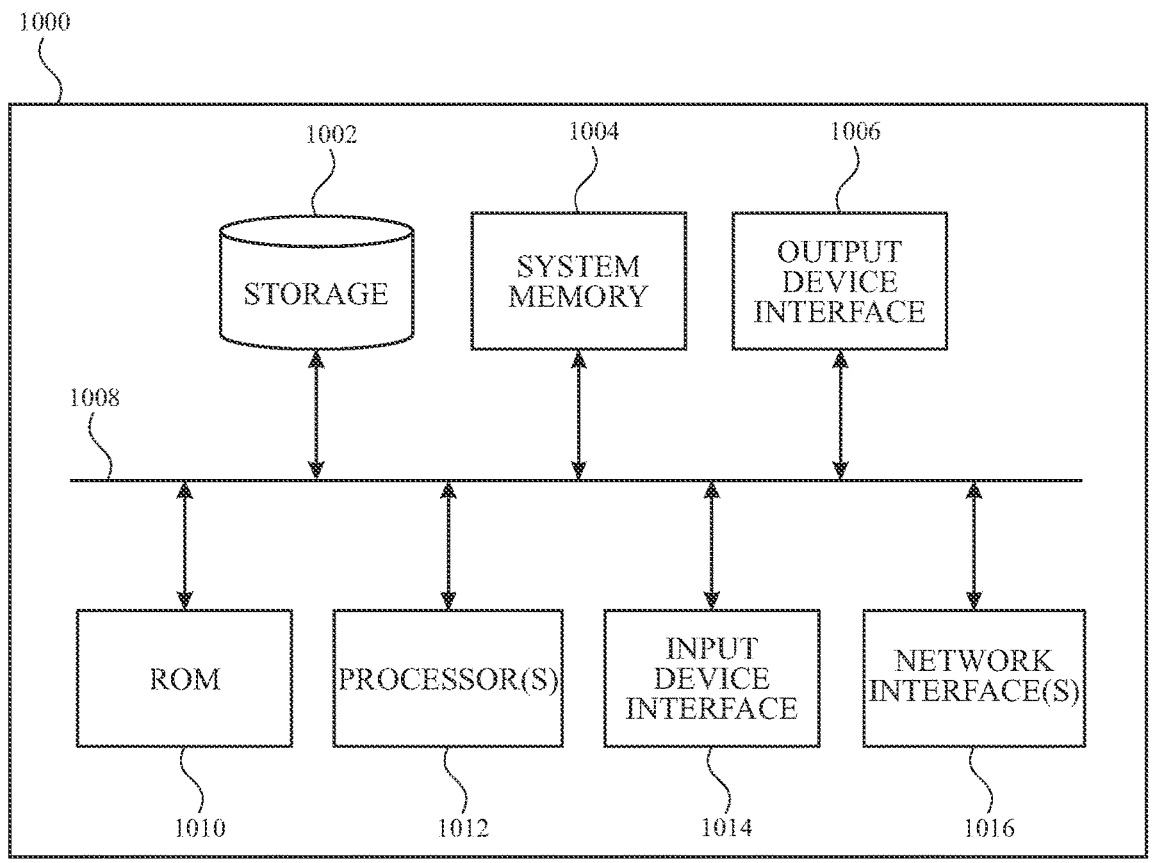
FIG. 10 illustrates an example electronic system with which aspects of the subject technology may be implemented in accordance with one or more implementations.

FIG. 10 illustrates an electronic system 1000 with which one or more implementations of the subject technology may be implemented. The electronic system 1000 can be, and/or can be a part of, one or more of the electronic devices 102-104, and/or one or the server 108 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the server 108 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

In accordance with aspects of the disclosure, a method is provided that includes displaying, with a display of an electronic device during operation of the display in a low power mode, an image frame from a series of image frames generated prior to operation of the display in the low power mode, where the image frame includes an image of a clock displaying a time corresponding to a current time, where the image frame was generated and stored prior to the current time; receiving, with the electronic device while displaying the image frame during the operation of the display in the low power mode, a user input corresponding to a specific function of the electronic device; activating, responsive to receiving the user input and without further user input, the specific function of the electronic device; and replacing the image frame on the display with a user interface associated with the specific function when the specific function is activated.

In accordance with aspects of the disclosure, a non-transitory computer-readable medium is provided including instructions that, when executed by one or more processors, cause the one or more processors to perform operations including displaying, with a display of an electronic device during operation of the display in a low power mode, an image frame from a series of image frames generated prior to operation of the display in the low power mode, where the image frame includes an image of a clock displaying a time corresponding to a current time, where the image frame was generated and stored prior to the current time; receiving, with the electronic device while displaying the image frame during the operation of the display in the low power mode, a user input corresponding to a specific function of the electronic device; activating, responsive to receiving the user input and without further user input, the specific function of the electronic device; and replacing the image frame on the display with a user interface associated with the specific function when the specific function is activated.

In accordance with aspects of the disclosure, a device is provided that includes a display; a processor; a first co-processor; a second co-processor; and a light sensor. The first co-processor is configured to receive signals from the light sensor. The second co-processor is configured to: display, during a low power mode for the display, an image frame from a series of image frames generated by the processor and prior to operation of the display in the low power mode and prior to a current time, where the image frame comprises a image of a clock displaying a time corresponding to the current time; receive, from the first co-processors, light information corresponding to the signals; and adjust a brightness or a color of the image frame responsive to the light information from the first co-processor.

In accordance with aspects of the disclosure, a method is provided that includes receiving, with a first co-processor of a device, signals from a light sensor of the device; displaying, with a second co-processor during a low power mode for a display of the device, an image frame from a series of image frames generated by a processor of the device prior to operation of the display in the low power mode and prior to a current time, wherein the image frame comprises a image of a clock displaying a time corresponding to the current time; receiving, from the first co-processor at the second co-processor, light information corresponding to the signals; and adjusting, with the second co-processor, a brightness or a color of the image frame responsive to the light information from the first co-processor In accordance with aspects of the disclosure, a method is provided that includes providing, upon startup of an electronic device, an operating system to a processor of the electronic device; providing, upon the startup of the electronic device, an image to a co-processor of the electronic device; and displaying the image on a display of the electronic device, with the co-processor, while the processor loads the operating system.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    displaying, with a display of an electronic device during operation of the display in a low power mode and with a co-processor of the electronic device that is separate from a processor of the electronic device, an image frame from a series of image frames generated prior to operation of the display in the low power mode wherein the image frame includes an indication of a current time and a complication;
    receiving, with the electronic device while displaying the image frame during the operation of the display in the low power mode, a user input corresponding to a specific function of the electronic device, wherein the user input comprises a touch input at a location of the complication in the image frame;

activating, responsive to receiving the user input and without further user input, the specific function of the electronic device; and replacing the image frame on the display with a user interface associated with the specific function when the specific function is activated, wherein the specific function comprises an application associated with the complication and activating the specific function of the electronic device comprises providing an instruction to the processor of the electronic device, while displaying the image frame, to activate the application.

2. The method of claim 1, wherein providing the instruction to the processor of the electronic device, while displaying the image frame, to activate the application, comprises continuing to display the image frame without modification of a brightness of the display during the activation of the application.

3. The method of claim 2, wherein replacing the image frame with the user interface comprises displaying a user interface of the application with the processor of the electronic device.

4. The method of claim 1, further comprising:
generating the series of image frames with the processor prior to operating the display in the low power mode; and
storing the series of image frames in memory of the electronic device, wherein the processor and the co-processor are configured to share access to the memory.

5. The method of claim 4, further comprising accessing the series of image frames with the co-processor while operating the display in the low power mode, using a memory map for the co-processor that has been arranged by the processor.

6. The method of claim 1, further comprising, prior to displaying the image frame with the co-processor, detecting, with the co-processor, a low power state of the processor.

7. The method of claim 6, further comprising managing, with the co-processor during the low power state of the processor, power consumption by the display.

8. The method of claim 7, wherein managing the power consumption by the display comprises controlling a frame rate of the display during display of the image frame based on a power budget for the display during the operation in the low power mode for the display.

9. The method of claim 1, wherein the touch input comprises a swipe on the display.

10. The method of claim 9, wherein replacing the image frame on the display with the user interface associated with the specific function when the specific function is activated comprises, while displaying a portion of the image frame without modifying a brightness of the portion of the image frame, progressively displaying an increasing portion of the user interface, increasing in a direction of the swipe.

11. The method of claim 1, wherein displaying the image frame during operation of the display in the low power mode comprises displaying the image frame during a low power mode of the processor of the electronic device in which the processor runs a media player application.

12. A non-transitory computer-readable medium comprising instructions that, when executed by one or more processors, cause the one or more processors to perform operations including:
displaying, with a display of an electronic device during operation of the display in a low power mode, an image frame from a series of image frames generated prior to operation of the display in the low power mode;
receiving, while displaying the image frame during the operation of the display in the low power mode, a user input corresponding to a specific function of the electronic device, wherein the user input comprises a swipe on the display;
activating, responsive to receiving the user input and without further user input, the specific function of the electronic device; and
replacing the image frame on the display with a user interface associated with the specific function when the specific function is activated,
wherein the specific function comprises an application associated with the swipe, and wherein replacing the image frame on the display with the user interface associated with the specific function when the specific function is activated comprises, while displaying a portion of the image frame without modifying a brightness of the portion of the image frame, progressively displaying an increasing portion of the user interface, increasing in a direction of the swipe.

13. The non-transitory computer-readable medium of claim 12, wherein the image frame comprises an image of a clock displaying a time corresponding to a current time, wherein the image frame was generated and stored prior to the current time.

14. A device, comprising:
a display;
a processor configured to run applications for the device;
a first co-processor;
a second co-processor; and
a light sensor, wherein:
the first co-processor is configured to receive signals from the light sensor;
the second co-processor is configured to:
display, during a low power mode for the display, an image frame from a series of image frames generated by the processor prior to operation of the display in the low power mode and prior to a current time;
receive, from the first co-processor, light information corresponding to the signals; and
adjust a brightness or a color of the image frame responsive to the light information from the first co-processor while the processor is inactive.

15. The device of claim 14, wherein the first co-processor is configured to:
compare the signals from the light sensor to a threshold; and
provide the light information corresponding to the signals to the second co-processor if the signals exceed the threshold.

16. The device of claim 14, further comprising memory, wherein the processor, the first co-processor, and the second co-processor each have access to the memory.

17. The device of claim 16, further comprising a first memory map for the processor, a second memory map for the first co-processor, and third memory map for the second co-processor, wherein the first memory map, the second memory map, and the third memory map each map logical addresses to physical addresses in the memory.

18. The device of claim 17, wherein the processor is configured to manage the first memory map, the second memory map, and the third memory map.

19. The device of claim 18, wherein the light sensor comprises an ambient light sensor.

20. A method, comprising:
receiving, with a first co-processor of a device, signals from a light sensor of the device;
displaying, with a second co-processor of the device during a low power mode for a display of the device, an image frame from a series of image frames generated by a processor of the device prior to operation of the display in the low power mode and prior to a current time;
receiving, from the first co-processor at the second co-processor, light information corresponding to the signals; and
adjusting, with the second co-processor, a brightness or a color of the image frame responsive to the light information from the first co-processor, wherein the processor is configured to run applications for the device, and wherein the second co-processor is configured to receive the light information from the first co-processor and adjust the brightness or the color of the image frame while the processor is inactive.

21. The method of claim 20, further comprising, with the first co-processor:
comparing the signals from the light sensor to a threshold; and
providing the light information corresponding the signals to the second co-processor if the signals exceed the threshold.

22. A method comprising:
providing, upon startup of an electronic device, an operating system to a processor of the electronic device;
providing, upon the startup of the electronic device, an image to a co-processor of the electronic device; and
displaying the image on a display of the electronic device, with the co-processor, while the processor loads the operating system.

23. The method of claim 22, further comprising:
receiving at the co-processor from the processor, after loading of the operating system by the processor, additional image information for display in place of the image.

24. The method of claim 22, wherein the image comprises a logo image including a logo associated with a manufacturer of the electronic device.

25. The method of claim 22, further comprising, providing firmware to the co-processor upon the startup of the electronic device.

26. The method of claim 25, wherein the firmware is provided to the co-processor and the operating system is provided to the processor by a boot loader of the electronic device.

27. The method of claim 22, further comprising, with the operating system running on the processor:
generating a data structure including a set of image frames with the processor;
inactivating the processor for a sleep state of the electronic device; and
displaying the set of image frames with the co-processor while the electronic device is in the sleep state.

* * * * *